United States Patent
Lee et al.

(10) Patent No.: US 9,069,062 B2
(45) Date of Patent: Jun. 30, 2015

(54) SURFACE RENDERING FOR VOLUME DATA IN AN ULTRASOUND SYSTEM

(75) Inventors: Kwang Hee Lee, Seoul (KR); June Young Ahn, Seoul (KR)

(73) Assignee: SAMSUNG MEDISON CO., LTD., Gangwon-Do (KR)

(*) Notice: Subject to any disclaimer, the term of this patent is extended or adjusted under 35 U.S.C. 154(b) by 1203 days.

(21) Appl. No.: 12/701,306

(22) Filed: Feb. 5, 2010

(65) Prior Publication Data
US 2010/0245353 A1    Sep. 30, 2010

(30) Foreign Application Priority Data
Mar. 24, 2009  (KR) .......... 10-2009-0024682

(51) Int. Cl.
  *G06T 17/00* (2006.01)
  *G01S 7/52* (2006.01)
  *G06T 15/08* (2011.01)
  *G01S 15/89* (2006.01)
  *G06T 7/00* (2006.01)

(52) U.S. Cl.
  CPC ............ *G01S 7/52017* (2013.01); *G06T 15/08* (2013.01); *G01S 15/8911* (2013.01); *G01S 15/8993* (2013.01); *G06T 7/0083* (2013.01); *G06T 2207/10132* (2013.01)

(58) Field of Classification Search
  CPC ........................................ G06T 15/08
  USPC ........................................ 600/443
  See application file for complete search history.

(56) References Cited

U.S. PATENT DOCUMENTS

| | | | |
|---|---|---|---|
| 5,911,691 A | 6/1999 | Mochizuki et al. | |
| 6,692,441 B1 * | 2/2004 | Poland et al. ............ | 600/443 |
| 7,604,595 B2 | 10/2009 | Steen et al. | |
| 7,864,176 B2 * | 1/2011 | Planck et al. ............ | 345/424 |
| 2004/0081340 A1 | 4/2004 | Hashimoto | |
| 2004/0252870 A1 | 12/2004 | Reeves et al. | |
| 2005/0283079 A1 | 12/2005 | Steen et al. | |
| 2006/0227137 A1 | 10/2006 | Weyrich et al. | |

(Continued)

FOREIGN PATENT DOCUMENTS

| | | |
|---|---|---|
| EP | 1582150 A1 | 10/2005 |
| EP | 1793350 A1 | 6/2007 |

(Continued)

OTHER PUBLICATIONS

Extended Search Report for EP 10152071.6-1248, Mailed Jul. 9, 2010, 7 pages.

(Continued)

*Primary Examiner* — Phi Hoang
(74) *Attorney, Agent, or Firm* — McDermott Will & Emery LLP

(57) ABSTRACT

Embodiments for performing surface rendering upon volume data in an ultrasound system are disclosed. An ultrasound data acquisition unit transmits and receives ultrasound signals to and from a target object to thereby acquire ultrasound data corresponding to a plurality of frames. A volume data forming unit forms volumes data corresponding to the plurality of frames based on the ultrasound data. The volume data includes a plurality of voxels. A processing unit detects edges of a region of interest (ROI) of the target object in the volume data and performs surface rendering upon voxels within the detected edges to thereby form a 3-dimensional ultrasound image.

10 Claims, 2 Drawing Sheets

(56) References Cited

U.S. PATENT DOCUMENTS

| | | | |
|---|---|---|---|
| 2007/0116357 A1* | 5/2007 | Dewaele | 382/173 |
| 2007/0167760 A1 | 7/2007 | Kim et al. | |
| 2007/0299639 A1 | 12/2007 | Weese et al. | |
| 2008/0019580 A1 | 1/2008 | Ohyu et al. | |
| 2008/0044054 A1* | 2/2008 | Kim et al. | 382/100 |
| 2008/0278490 A1* | 11/2008 | Dekel | 345/424 |
| 2009/0082668 A1 | 3/2009 | Hamada et al. | |
| 2010/0002927 A1* | 1/2010 | Kalayeh | 382/132 |
| 2010/0159497 A1* | 6/2010 | Kimia et al. | 435/29 |

FOREIGN PATENT DOCUMENTS

| | | |
|---|---|---|
| EP | 1973076 A1 | 9/2008 |
| JP | 10-033538 A | 2/1998 |
| JP | 2004-141514 A | 5/2004 |
| JP | 2006-006933 A | 1/2006 |
| JP | 2006-277748 A | 10/2006 |
| JP | 2007-152109 A | 6/2007 |
| JP | 2008-043736 A | 2/2008 |
| JP | 2008-243046 A | 10/2008 |
| JP | 2009-072400 A | 4/2009 |

OTHER PUBLICATIONS

Korean Office Action issued in Korean Patent Application No. KR 10-2009-0024682 dated Apr. 20, 2011.

European Office Action issued in European Application No. 10 152 071.6 dated Oct. 31, 2013, 14 pgs.

Japanese Office Action issued in Japanese Application No. 2010-053523 mailed Jan. 7, 2014, with English translation, 5 pgs.

Japanese Non-Final Rejection, w/ partial English translation thereof, issued in Japanese Patent Application No. JP 2010-053523 dated May 20, 2014.

H.W. Jensen et al., "A Practical Model for Subsurface Light Transport," to appear in the SIGGRAPH conference proceedings; 8 pages; (2001).

* cited by examiner

SURFACE RENDERING FOR VOLUME DATA IN AN ULTRASOUND SYSTEM

The present application claims priority from Korean Patent Application No. 10-2009-0024682 filed on Mar. 24, 2009, the entire subject matter of which is incorporated herein by reference.

TECHNICAL FIELD

The present disclosure generally relates to ultrasound systems, and more particularly to an ultrasound system and method of performing surface rendering upon volume data.

BACKGROUND

An ultrasound system has become an important and popular diagnostic tool since it has a wide range of applications. Specifically, due to its non-invasive and non-destructive nature, the ultrasound system has been extensively used in the medical profession. Modern high-performance ultrasound systems and techniques are commonly used to produce two or three-dimensional diagnostic images of internal features of an object (e.g., human organs).

The ultrasound system may transmit ultrasound signals to a target object and receive echo signals reflected from the target object. The ultrasound system may form volume data based on the received echo signals, and then perform rendering upon the volume data to thereby form a 3-dimensional ultrasound image. The 3-dimensional ultrasound image may be indicative of clinical information such as spatial information, anatomical information, etc. of the target object, which may not be visualized in a 2-dimensional ultrasound image.

Generally, rendering a 3-dimensional image may be carried out by using volume data obtained from a target object. Such rendering technique is referred to as volume rendering and may be implemented by synthesizing reflection coefficients of data at all sampling points on a ray casted into the volume data in addition to data corresponding to the surface of a region of interest in the target object.

SUMMARY

Embodiments for performing surface rendering upon volume data are disclosed herein. In one embodiment, by way of non-limiting example, an ultrasound system comprises: an ultrasound data acquisition unit configured to transmit and receive ultrasound signals to and from a target object to thereby acquire ultrasound data corresponding to a plurality of frames; a volume data forming unit configured to form volume data corresponding to the plurality of frames based on the ultrasound data, the volume data including a plurality of voxels; and a processing unit configured to detect edges of a region of interest (ROI) of the target object from the volume data and perform surface rendering upon voxels within the detected edges to thereby form a 3-dimensional ultrasound image.

In another embodiment, a method of performing surface rendering upon volume data in an ultrasound system including an ultrasound data acquisition unit, a volume data forming unit and a processing unit, comprises: a) at the ultrasound data acquisition unit, transmitting and receiving ultrasound signals to and from a target object to thereby acquire ultrasound data corresponding to a plurality of frames; b) at the volume data forming unit, forming volume data corresponding to the plurality of frames based on the ultrasound data, the volume data including a plurality of voxels; and c) at the processing unit, detecting edges of a region of interest (ROI) of the target object from the volume data; and d) at the processing unit, performing surface rendering upon voxels within the detected edges to thereby form a 3-dimensional ultrasound image.

The Summary is provided to introduce a selection of concepts in a simplified form that are further described below in the Detailed Description. This Summary is not intended to identify key or essential features of the claimed subject matter, nor is it intended to be used in determining the scope of the claimed subject matter.

DETAILED DESCRIPTION

A detailed description may be provided with reference to the accompanying drawings. One of ordinary skill in the art may realize that the following description is illustrative only and is not in any way limiting. Other embodiments of the present invention may readily suggest themselves to such skilled persons having the benefit of this disclosure.

Figure 1:
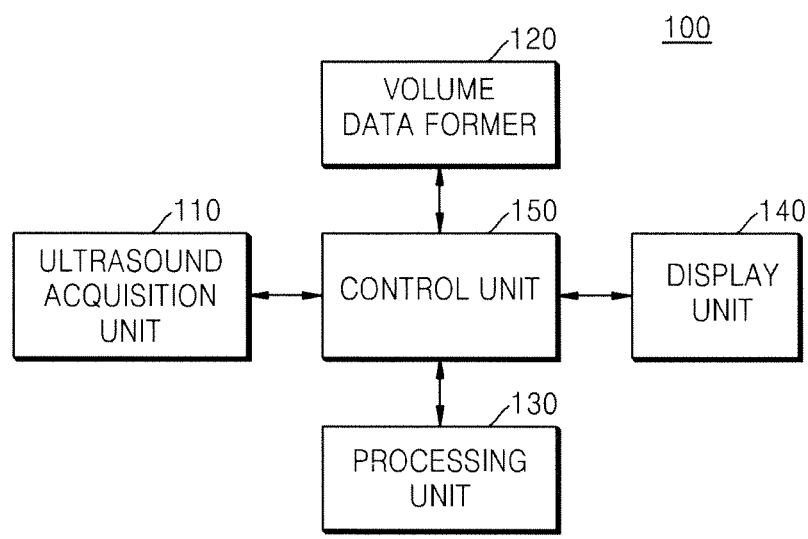
FIG. 1 is a block diagram showing an illustrative embodiment of an ultrasound system.

FIG. 1 is a block diagram showing an illustrative embodiment of an ultrasound system. As depicted therein, the ultrasound system 100 may include an ultrasound data acquisition unit 110. The ultrasound data acquisition unit 110 may be configured to transmit and receive ultrasound signals to and from a target object to thereby form ultrasound data indicative of the target object.

Figure 2:
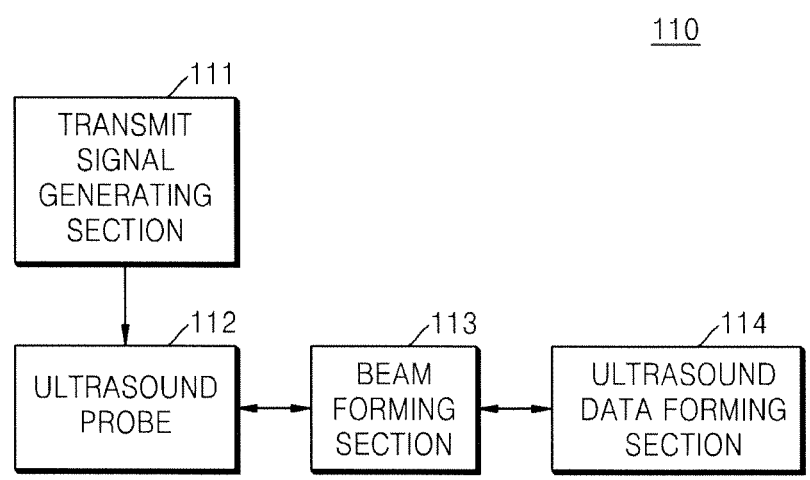
FIG. 2 is a block diagram showing an illustrative embodiment of an ultrasound data acquisition unit.

Referring to FIG. 2, the ultrasound data acquisition unit 110 may include a transmit signal generating section 111. The transmit signal generating section 111 may be operable to generate a plurality of transmit signals. The ultrasound data acquisition unit 110 may further include an ultrasound probe 112 containing a plurality of elements for reciprocally converting ultrasound signals and electrical signals. The ultrasound probe 112 may be configured to transmit ultrasound signals into a target object in response to the transmit signals. The ultrasound probe 112 may be further configured to receive echo signals reflected from the target object to thereby output electrical receive signals, which may be analog signals.

The ultrasound data acquisition unit 110 may further include a beam forming section 113. The beam forming section 113 may be configured to convert the electrical receive signals into digital signals. The beam forming section 113 may be further configured to apply delays to the digital signals in consideration of distances between the elements and focal points, thereby outputting digital receive-focused signals.

The ultrasound data acquisition unit 10 may further include an ultrasound data forming section 114 that may be operable to form ultrasound data based on the digital receive-focused signals. The ultrasound data forming section 114 may perform signal processing such as gain adjustment, filtering and the like upon the digital receive-focused signals in forming the ultrasound data.

Referring back to FIG. 1, the ultrasound system 100 may further include a volume data forming unit 120 that may be operable to form volume data corresponding to a plurality of frames by using the ultrasound data. The volume data may include a plurality of voxels, wherein each voxel has a brightness value.

The ultrasound system 100 may further include a processing unit 130 that may be operable to perform surface rendering upon the volume data to form a 3-dimensional image. The processing unit 130 may be operable to detect edges corresponding to a region of interest (ROI) from the volume data and perform the surface rendering upon voxels within the detected edges from volume data.

Figure 3:
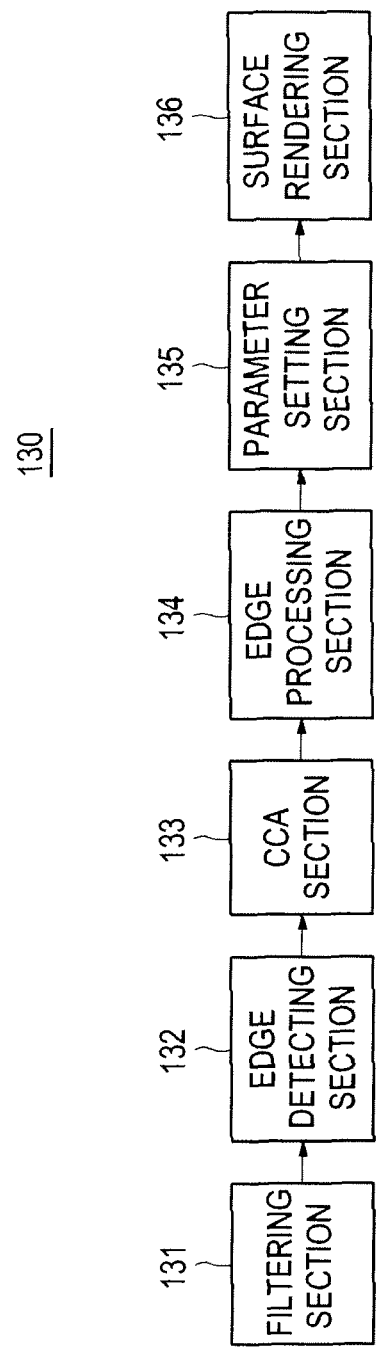
FIG. 3 is a block diagram showing an illustrative embodiment of a processing unit.

FIG. 3 is a block diagram showing an illustrative embodiment of the processing unit 130. The processing unit 130 may include a filtering section 131 that may be operable to perform filtering upon the volume data for edge enhancement and noise removal. In one embodiment, by way of non-limiting example, the filtering section 130 may be embodied by a denoising filter including a total variation filter, an anisotropic diffusion filter and the like.

The processing unit 130 may further include an edge detecting section 132 that may be operable to detect edges from frames included in the filtered volume data. In one embodiment, the edges may be detected by using an edge mask such as Sobel, Prewitt, Robert, Canny and the like. Alternatively, the edges may be detected by using eigenvalue differences using an edge structure tensor.

The processing unit 130 may further include a connected component analysis (CCA) section 133. The CCA section 133 may be operable to perform CCA upon the detected edges to detect voxels corresponding to the edges connected to each other. The CCA section 133 may be further operable to perform labeling upon the detected voxels and group the labeled voxels into a plurality of voxel groups, wherein each voxel group has an identical label.

The processing unit 130 may further include an edge processing section 134 that may be operable to compare the voxel groups to determine a voxel group having the largest number of voxels. The edge processing section 134 may be further operable to set the determined voxel group as the ROI, for example, a face of a fetus.

The processing unit 130 may further include a parameter setting section 135. The parameter setting section 135 may be operable to set a first parameter for use in performing surface rendering upon the voxels within the ROI and a second parameter for use in processing skin tone. In one embodiment, the first parameter may include a parameter of a bidirectional surface scattering reflection distribution function (BSSRDF) model. The parameter of the BSSRDF model may be set by using various well-known methods. Thus, a detailed description thereof will be omitted herein. Also, the first parameter may include parameters of various surface scattering models. In one embodiment, the second parameter may be set manually by a user or automatically in the ultrasound system 100.

The processing unit 130 may further include a surface rendering section 136. The surface rendering section 136 may be operable to perform surface rendering and skin tone processing upon the voxels within the ROI by using the first and second parameters to thereby form a 3-dimensional ultrasound image. By doing so, a more realistic 3-dimensional ultrasound image may be formed.

Referring back to FIG. 1, the ultrasound system 100 may further include a display unit 140 to display the 3-dimensional ultrasound image, and a control unit 150 that may be operable to control the entire operations of parts of the ultrasound system 100 including those shown in FIGS. 1-3. For example, the control unit 150 may control the transmission and reception of the ultrasound signals, the surface rendering and the display of the 3-dimensional ultrasound image.

Although embodiments have been described with reference to a number of illustrative embodiments thereof, it should be understood that numerous other modifications and embodiments can be devised by those skilled in the art that will fall within the spirit and scope of the principles of this disclosure. More particularly, numerous variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An ultrasound system, comprising:
an ultrasound data acquisition unit configured to transmit and receive ultrasound signals to and from a target object to thereby acquire ultrasound data corresponding to a plurality of frames;
a volume data former configured to generate volume data corresponding to the plurality of frames based on the ultrasound data, the volume data including a plurality of voxels; and
a processing unit configured to detect edges from frames included in the volume data, detect voxels of the edges connected to each other, label upon the detected edges, group the labeled voxels into a plurality of voxel groups, determine a voxel group based on the number of voxels among the voxel groups, set the determined voxel group as a region of interest (ROI), set a first parameter including a parameter associated with surface reflection and a second parameter for processing skin tone based on a user input, and perform surface rendering upon voxels within the ROI by using the first parameter and the second parameter to thereby form a 3-dimensional ultrasound image.

2. The ultrasound system of claim 1, wherein the processing unit performs
connected component analysis (CCA) upon the detected edges, each voxel group has an identical label, and
the determined voxel group has the largest number of voxels among the voxel groups.

3. The ultrasound system of claim 2, wherein the processing unit further performs filtering for edge enhancement and noise removal upon the volume data.

4. The ultrasound system of claim 3, wherein the processing unit performs a denoising filter.

5. The ultrasound system of claim 1, further comprising a display unit to display the 3-dimensional ultrasound image.

6. A method of performing surface rendering upon volume data in an ultrasound system including an ultrasound data acquisition unit, a volume data forming unit and a processing unit, comprising:
a) at the ultrasound data acquisition unit, transmitting and receiving ultrasound signals to and from a target object to thereby acquire ultrasound data corresponding to a plurality of frames;
b) at the volume data forming unit, forming volume data corresponding to the plurality of frames based on the ultrasound data, the volume data including a plurality of voxels;
c) at the processing unit, detecting edges from frames included in the volume data, detecting voxels of the edges connected to each other, labeling upon the detected edges, grouping the labeled voxels into a plurality of voxel groups, determining a voxel group based on the number of voxels among the voxel groups, setting the determined voxel group as a region of interest (ROI);

d) at the processing unit, setting a first parameter including a parameter associated with surface reflection and a second parameter for processing skin tone based on a user input; and e) at the processing unit, performing surface rendering upon voxels within the ROI by using the first parameter and the second parameter to thereby form a 3-dimensional ultrasound image.

7. The method of claim 6, further comprising performing filtering for edge enhancement and noise removal upon the volume data before the step c).

8. The method of claim 6, wherein the step c) includes performing edge detection upon the respective frames to detect the edges.

9. The method of claim 6, wherein the step c) includes:
performing connected component analysis upon the detected edges,
each voxel group has an identical label; and
comparing the voxels within the respective groups to determine a voxel group having the largest number of voxels.

10. The method of claim 6, further comprising displaying the 3-dimensional ultrasound image on a display unit.

* * * * *